United States Patent

[11] 3,607,899

[72] Inventors Eric D. Brown;
 Loren A. Haluska, both of Midland, Mich.
[21] Appl. No. 862,038
[22] Filed Sept. 29, 1969
[45] Patented Sept. 21, 1971
[73] Assignee Dow-Corning Corporation
 Midland, Mich.

[54] PRODUCTION OF TRIMETHYLSILYL-ENDBLOCKED TRIFLUOROPROPYLMETHYLPOLYSILOXANES
 5 Claims, No Drawings
[52] U.S. Cl. ........................................................260/448.2 E,
 260/46.5 R
[51] Int. Cl. ........................................................ C07f 7/02

[50] Field of Search............................................ 260/448.2 E

[56] References Cited
 UNITED STATES PATENTS
 2,961,425  11/1960  Pierce et al. ................. 260/448.2 E

*Primary Examiner*—Tobias E. Levow
*Assistant Examiner*—Werten F. W. Bellamy
*Attorneys*—Robert F. Fleming, Jr., Laurence R. Hobey, Harry D. Dingman and Norman E. Lewis

ABSTRACT: Trimethylsilyl-endblocked trifluoropropylmethylpolysiloxanes are produced by the acid-clay catalyzed reaction of the trifluoropropylmethylcyclotrisiloxane with a trimethylsilyl-endblocker.

PRODUCTION OF TRIMETHYLSILYL-ENDBLOCKED TRIFLUOROPROPYLMETHYLPOLYSILOXANES

This invention relates to a method of polymerizing trifluoropropylmethylcyclotrisiloxanes. In one aspect, the invention relates to the use of new catalysts in the production of fluorosilicones.

Because of their stability over a wide temperature range and good lubricity characteristics, trimethylsilyl endblocked 3,3,3-trifluoropropylmethylpolysiloxane fluids have found utility in a variety of applications. The only commercially feasible method of producing these fluid polymers utilizes a sulfonic acid catalyst; see Pierce and Holbrook, U.S. Pat. No. 2,961,425. The sulfonic acid catalysts are soluble in the product and distillation or washing is necessary to effect removal of the catalyst. In addition to difficulties in complete removal, the catalysts are quite expensive.

Practice of the present invention entails the use of a most inexpensive solid catalyst which is readily separated from the fluorosilicone product by filtration.

Accordingly, it is an object of the invention to provide a simplified, economical method of producing fluorosilicone fluids.

In accordance with the invention, there is provided a method of producing linear trimethylsilyl-endblocked 3,3,3-trifluoropropylmethylpolysiloxanes which comprises:

a. partially reacting a mixture of (1) 3,3,3-trifluoropropylmethylcyclotrisiloxane, (2) a siloxane selected from the group consisting of hexamethyldisiloxane and polymers of the formula $(CH_3)_3SiO[CF_3CH_2CH_2(CH_3)SiO]_n Si(CH_3)_3$ in which $n$ is an integer of from 1 to 10, in contact with (3) a catalytic amount of an acidic aluminum silicate clay for at least one hour at from 75° to 90° C.; and, thereafter, b. completing the reaction by heating the catalyst-containing reaction mixture at a temperature in the range of from 120° to 140° C. until substantially all of the cyclotrisiloxane is reacted.

The cyclotrisiloxane precurser is well known in the art. It can be prepared by hydrolysis of the corresponding dichlorosilane followed by condensation of the hydrolyzate in the presence of an alkali metal hydroxide or an alkali metal salt of siloxane under conditions which cause the cyclic to distill from the reaction mixture.

The siloxanes (2) are supplied as endblocking units. Mixtures of siloxanes (2) can be used in the process of the invention. When only the disiloxane is reacted, only trimethylsilyl endblocking units are supplied to the system, while the use of the higher polymer supplies units to be incorporated into the polymer chain in addition to the endblocks. The viscosity of the fluid product is controlled by the ratio of trimer (1) to siloxane (2) and generally is in the range of from 100 to 300,000 cs. at 25° C.

The catalyst (3) is acid-activated clay having a large surface area per unit of weight. The aluminum silicate-containing clays are usually activated by contacting the materials with sulfuric acid. After contact with the acid, the clays are dried and ground to the desired particle size. The acid clay must be present in what is generally known as a catalytic amount which in the process of the invention is one percent by weight or greater based on the weight of reactants. There is no critical upper limit to the amount of catalyst which is utilized, but since the catalyst is removed from the product, amounts in excess of 10 weight percent are not desireable. It is preferred to operate with from 2 to 5 weight percent catalyst because optimum reaction rates are obtained and filtration of the product is facilitated.

One requirement of the present method is that the mixture of reactants and catalyst be maintained at from 75° to 90° C. for about 1 hour. Apparently, this step is necessary to avoid poisoning of the catalyst at the higher reaction temperatures. The temperature at which the reaction is completed is critical. At below 120° C. the reaction is quite sluggish and at 110° C. there is no reaction at all. At above 140° the reaction slows and soon halts. It is preferred that the reaction mixture be maintained at from 130°–135° C. until the trimer is consumed.

After all of the cyclic trimer has been reacted, the reaction mixture is cooled and filtered. Depending upon the viscosity of the final product, it may be desireable to dilute the fluid with methylene chloride for easier filtration. If necessary, volatiles can be stripped from the fluid product.

The fluid trifluoropropylmethylpolysiloxanes produced by the method of the invention are essentially free of any cationic materials and are thus suitable for use as dielectric fluids in capacitors and transformers.

The following examples are illustrative of the invention which is set forth in the claims.

EXAMPLE 1

A stirred mixture of 310 grams of 3,3,3-trifluoropropylmethylcyclotrisiloxane, 1.62 grams of hexamethyldisiloxane and 3.2 grams of an acidic aluminum silicate clay (Filtrol 13) was heated to 80° C. and held at that temperature for one hour. It was then heated to 130° C. and maintained at that temperature for 16 hours, at which time g.l.c. analysis showed the cyclic trimer to be completely reacted. The reaction mixture was cooled to room temperature and diluted with 250 milliliters of methylene chloride. The solution was filtered through a filter aid supported on a glass frit, using a water aspirator. The methylene chloride was distilled off at atmospheric pressure and the remaining fluid product was devolatilized at 280° C./0.4 mm. Hg. The product, trimethylsilyl-endblocked 3,3,3-trifluoropropylmethylpolysiloxane, having a viscosity of 15,560 cs. at 25° C. and a flash point of 595° F., was obtained in 82 percent yield.

In a similar run, the quantity of acid clay was increased to 6.4 grams while the same amounts of reactants were used. This approximate 2 weight percent catalyst level was beneficial in that the reaction was complete in 2½ hours at 130° C.

EXAMPLE 2

A stirred mixture of 749 grams of 3,3,3-trifluoropropylmethylcyclotrisiloxane, 47.7 grams of $CH_3SiO[CF_3CH_2CH_2(CH_3)SiO]Si(CH_3)_3$ and 16 grams of an acidic aluminum silicate clay (Filtrol 13 LM) was heated at 80° C. for 2 hours. It was then heated to 135° C. and maintained at that temperature for 7 hours, at which time the g.l.c. analysis showed that cyclic trimer to be completely reacted. The reaction mixture was cooled and filtered to remove the acid clay.

The filtrate (600.4 grams) was stripped at 233° C./3 mm. Hg. to remove volatile linear species. The product, trimethylsilyl-endblocked 3,3,3-trifluoropropylmethylpolysiloxane, having a viscosity of 553 cs. at 25° C. and a flash point of 440° F., was obtained in 68 percent yield.

That which is claimed is:

1. A method of producing linear 3,3,3-trifluoropropylmethylpolysiloxanes comprising
   a. reacting a mixture of (1) 3,3,3-trifluoropropylmethylcyclotrisiloxane, (2) a siloxane selected from the group consisting of hexamethyldisiloxane and $(CH_3)_3SiO[CF_3CH_2CH_2(CH_3)SiO]_nSi(CH_3)_3$ in which $n$ is an integer of 1 to 10, in contact with (3) a catalytic amount of an acidic aluminum silicate clay for at least 1 hour at from 75° to 90° C., and thereafter,
   b. heating the reaction mixture and clay catalyst at a temperature in the range of from 120° to 140° C. until substantially all of the cyclo-trisiloxane is reacted.

2. The method of claim 1 wherein the catalyst (3) is present in amount equal to at least 1 weight percent, based on the weight of reactants (1) and (2).

3. The method of claim 2 wherein siloxane (2) is hexamethyldisiloxane.

4. The method of claim 1 wherein the temperature of step (b) is maintained at from 130°–135° C.

5. The method of claim 1 including the subsequent step (c) of filtering the reaction mixture to remove the clay.